(12) United States Patent
Pomish et al.

(10) Patent No.: US 11,305,694 B2
(45) Date of Patent: Apr. 19, 2022

(54) DEVICES, SYSTEMS, AND METHODS FOR CALIBRATING A VEHICLE MIRROR ASSEMBLY

(71) Applicant: TOYOTA MOTOR ENGINEERING & MANUFACTURING NORTH AMERICA, INC., Plano, TX (US)

(72) Inventors: Ethan W. Pomish, Livonia, MI (US); Todd Muck, Fowlerville, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 164 days.

(21) Appl. No.: 16/674,403

(22) Filed: Nov. 5, 2019

(65) Prior Publication Data
US 2021/0129754 A1   May 6, 2021

(51) Int. Cl.
*B60R 1/074* (2006.01)
*B60R 1/00* (2006.01)
*B60R 1/12* (2006.01)

(52) U.S. Cl.
CPC .............. *B60R 1/074* (2013.01); *B60R 1/003* (2013.01); *B60R 2001/1223* (2013.01)

(58) Field of Classification Search
CPC . B60R 1/074; B60R 1/003; B60R 2001/1223; B60R 1/078
See application file for complete search history.

(56) References Cited

U.S. PATENT DOCUMENTS

| | | | |
|---|---|---|---|
| 6,151,175 A * | 11/2000 | Osha | B60R 1/025 33/264 |
| 7,114,817 B2 | 10/2006 | Evans et al. | |
| 7,287,867 B2 | 10/2007 | Wellington et al. | |
| 9,449,390 B1 | 9/2016 | Ghneim | |
| 9,919,652 B2 * | 3/2018 | Dupuis | B60R 1/002 |
| 10,118,451 B1 * | 11/2018 | Salter | B60R 1/07 |
| 10,195,994 B2 | 2/2019 | Abdel-Rahman et al. | |
| 2016/0107579 A1 | 4/2016 | Quinn | |
| 2018/0290595 A1 | 10/2018 | Dudar | |
| 2019/0061626 A1 * | 2/2019 | Dupuis | B60R 1/062 |
| 2020/0346581 A1 * | 11/2020 | Lawson | H04N 13/239 |

FOREIGN PATENT DOCUMENTS

WO     2017124038 A1     7/2017

* cited by examiner

*Primary Examiner* — Clifford Hilaire
*Assistant Examiner* — Tyler B Edwards
(74) *Attorney, Agent, or Firm* — Dinsmore & Shohl LLP (57) ABSTRACT

A system is disclosed and includes a vehicle. The vehicle includes a plurality of sensors including a first set and a second set. The vehicle includes a mirror assembly that includes a mirror body and one or more actuators that are actuable to move the mirror assembly between an extended position and a retracted position. The second set is positioned on the mirror assembly. The vehicle includes a controller communicatively coupled to the plurality of sensors and the one or more actuators, and the controller causes the one or more actuators to adjust a position of the mirror body based on information received from the first set. The controller selectively activates the second set based on the position of the mirror body. The controller calibrates the second set of the plurality of sensors while the position of the mirror body is being set to the extended position.

18 Claims, 9 Drawing Sheets

DEVICES, SYSTEMS, AND METHODS FOR CALIBRATING A VEHICLE MIRROR ASSEMBLY

FIELD

The present specification generally relates to devices, systems, and methods for calibrating a vehicle mirror assembly, and more particularly, to selectively setting a position of a vehicle mirror assembly during a position calibration process, selectively activating one or more sensors of a vehicle mirror assembly, and calibrating one or more sensors of a vehicle mirror assembly based on the position of the vehicle mirror assembly.

BACKGROUND

When a vehicle is used to tow an object such as a trailer, boat, or other object of the like, a towing mirror assembly of the vehicle may be provided. Towing mirror assemblies may extend further outwardly from the vehicle relative to standard vehicle mirror assemblies to provide an operator of the vehicle with a view of the roadway behind or along the side of the object being towed.

However, conventional towing mirror assemblies do not include one or more components, such as a mirror body and one or more sensors, that are selectively positioned and activated based on various information obtained by the vehicle. Furthermore, conventional towing mirror assemblies do not include sensors that are selectively calibrated in order to optimize the view provided by the towing mirror assembly. Accordingly, a need exists for one or more components that selectively set a position of the towing mirror assembly during a position calibration process and selectively activate one or more sensors of the towing mirror assembly. Furthermore, a need exists for one or more components that calibrate sensors based on a position of the towing mirror assembly.

SUMMARY

In an aspect, a vehicle includes a plurality of sensors comprising a first set and a second set. The vehicle includes a mirror assembly that includes a mirror body and one or more actuators that are actuable to move the mirror assembly between an extended position and a retracted position, wherein the second set of the plurality of sensors is positioned on the mirror assembly. The vehicle includes a controller communicatively coupled to the plurality of sensors and the one or more actuators, wherein the controller causes the one or more actuators to adjust a position of the mirror body based on information received from the first set of the plurality of sensors. The controller selectively activates the second set of the one or more sensors based on the position of the mirror body. The controller calibrates the mirror assembly while the position of the mirror body is being set to the extended position.

In an aspect, a method of operating a mirror assembly of a vehicle is disclosed. The vehicle includes a plurality of sensors, and the plurality of sensors includes a first set and a second set. The second set of the plurality of sensors is positioned on the mirror assembly, and the mirror assembly includes a mirror body and one or more actuators that are actuable to move the mirror assembly between an extended position and a retracted position. The method incudes adjusting, using a controller, a position of the mirror body based on information received from the first set of the plurality of sensors. The method includes selectively activating, using the controller, the second set of the plurality of sensors based on the position of the mirror body. The method includes calibrating the second set of the plurality of sensors while the position of the mirror body is being set to the extended position.

In an aspect, a vehicle includes a plurality of sensors comprising a first set and a second set. The vehicle includes a mirror assembly that includes a mirror body and one or more actuators that are actuable to move the mirror assembly between an extended position and a retracted position, wherein the second set of the plurality of sensors is positioned on the mirror assembly. The vehicle includes a controller communicatively coupled to the plurality of sensors and the one or more actuators, wherein the controller causes the one or more actuators to adjust a position of the mirror body based on information received from the first set of the plurality of sensors. The controller selectively activates the second set of the one or more sensors based on the position of the mirror body. The controller calibrates a position of the mirror assembly while the position of the mirror body is being set to the extended position.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

DETAILED DESCRIPTION

Referring to the figures, embodiments of the present disclosure are generally related to devices, systems, and methods for selectively positioning a towing mirror assembly during a position calibration process and selectively activating one or more components, such as a sensor, of the towing mirror assembly based on data obtained by a corresponding vehicle system. Accordingly, the towing mirror assembly provides a view of the roadway behind or along the side of an object being towed when extended to an extended position, while also optimizing various sensor functions of one or more sensors disposed thereon when the towing mirror assembly is extended to the extended position, as described herein in greater detail.

Furthermore, embodiments of the present disclosure are generally related to devices, systems, and methods for calibrating one or more sensors of the towing mirror assemblies based on the distance in which the towing mirror assembly extends from the vehicle. By calibrating the one or more sensors of the towing mirror assembly based on the distance in which the towing mirror assembly extends from the vehicle, the accuracy of various vehicle functions (e.g., a blind spot monitoring functions, lane keeping assist functions, and/or the like) are improved, as described herein in greater detail.

As used herein, the phrase "vehicle longitudinal direction" refers to the forward-rearward direction of the vehicle (i.e., in the +/−vehicle X-direction as depicted). The phrase "vehicle lateral direction" refers to the cross-vehicle direction of the vehicle (i.e., in the +/−vehicle Z-direction as depicted), and is transverse to the vehicle longitudinal direction. The phrase "vehicle vertical direction" refers to the upward-downward direction of the vehicle (i.e., in the +/−vehicle Y-direction as depicted). Further, the terms "upward," "downward," "rearward," and "forward" are used to describe the relative positioning of various components of the vehicle relative to one another. Because the vehicle structures may be generally symmetrical about the vehicle centerline, the terms "upward," "downward," "rearward," and "forward" may be switched when evaluating components positioned along opposite sides of the vehicle. Further, while certain components of the vehicle are described as extending in one of the identified directions or oriented toward one of the identified directions, it should be understood that these components extend or are oriented in at least these recited directions.

Figure 1:
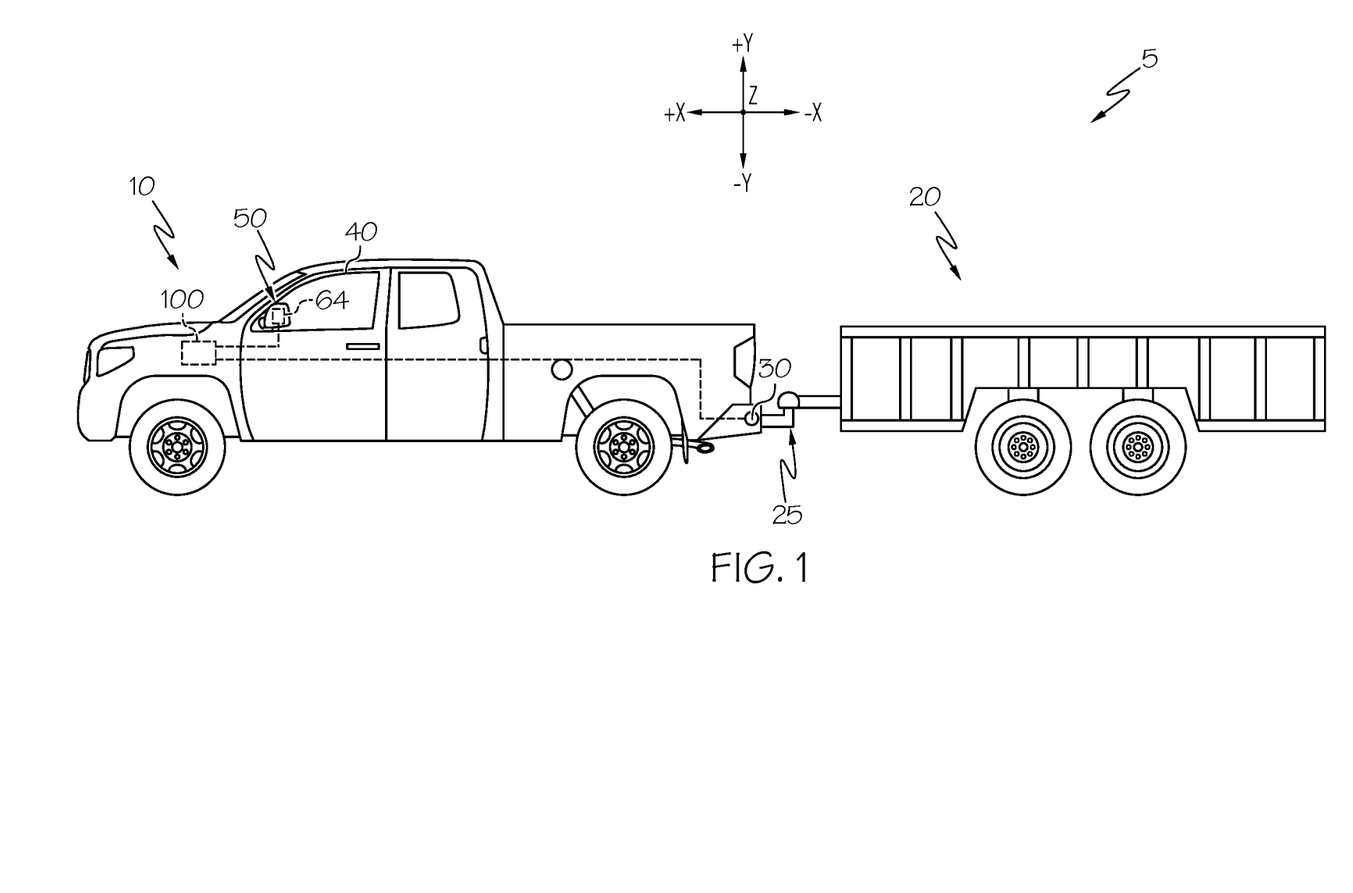
FIG. 1 schematically depicts an illustrative vehicle system including a vehicle and a trailer attached thereto according to one or more embodiments shown and described herein.

Referring now to FIG. 1, an illustrative vehicle system 5 is schematically depicted. In the illustrated embodiment of FIG. 1, the vehicle system 5 generally includes a towing vehicle 10, a trailing vehicle 20, a hitch 25, one or more rear sensors 30, a door 40, and a mirror assembly 50. While FIG. 1 depicts the towing vehicle 10 as being a truck, other vehicle styles are contemplated. For example, the towing vehicle 10 may be a car, a sport utility vehicle (SUV), a van, and the like.

In some embodiments, the trailing vehicle 20, which is positioned behind a rear 12 of the towing vehicle 10 in the negative vehicle longitudinal direction (i.e., −X direction), may be coupled to the towing vehicle 10 via the hitch 25. The hitch 25 may be attached to the towing vehicle 10, and the towing vehicle 10 may move the trailing vehicle 20 attached thereto by pulling or pushing the trailing vehicle 20. The towing vehicle 10 and/or the trailing vehicle 20 may transport a load or cargo positioned therein. While the illustrated embodiment of FIG. 1 depicts the trailing vehicle 20 as a trailer, it should be understood that the towing vehicle 10 may transport various objects located behind the towing vehicle 10, such as a cargo container, a boat, a second vehicle, and/or the like.

The one or more rear sensors 30 may each be any sensor configured to generate proximity information corresponding to an environment surrounding the rear 12 of the towing vehicle 10. As a non-limiting example, the one or more rear sensors 30 may be at least one of a LIDAR sensor, a radar sensor, an infrared (IR) sensor, a sonar sensor, an ultrasonic sensor, an optical sensor, a Doppler effect sensor, and/or the like. The one or more rear sensors 30 may be positioned at the rear 12 of the towing vehicle 10. It should be understood that the one or more rear sensors 30 may be positioned at other ends and regions of the towing vehicle 10, and the positions of the one or more rear sensors 30 are not limited to the embodiments described herein. As a non-limiting example, the one or more rear sensors 30 may be positioned on or near the door 40 of the towing vehicle 10. As another non-limiting example, the one or more rear sensors 30 may be one or more rear-facing sensors (i.e., facing in the −X direction).

The mirror assembly 50 may be coupled to the door 40 of the towing vehicle 10 in some embodiments. As described below in further detail, one or more mirror sensors 64 of the mirror assembly 50 may be selectively activated by a controller 100 based on sensor data obtained by the one or more rear sensors 30. The one or more mirror sensors 64 and the one or more rear sensors 30 may be communicatively coupled to the controller 100, as indicated by the dashed lines in FIG. 1. Furthermore, the mirror assembly 50 may be operable in one of an extended position and a retracted position, as described below in further detail.

Various illustrative mirror assemblies 50 will now be provided below with reference to FIGS. 2A-2C. It should be understood that the mirror assemblies 50 are not limited to the embodiments described herein, and the mirror assemblies 50 may be any mirror assembly configured to provide a view of the roadway behind or along the side of the object being towed (e.g., the trailing vehicle 20).

Figure 2A:
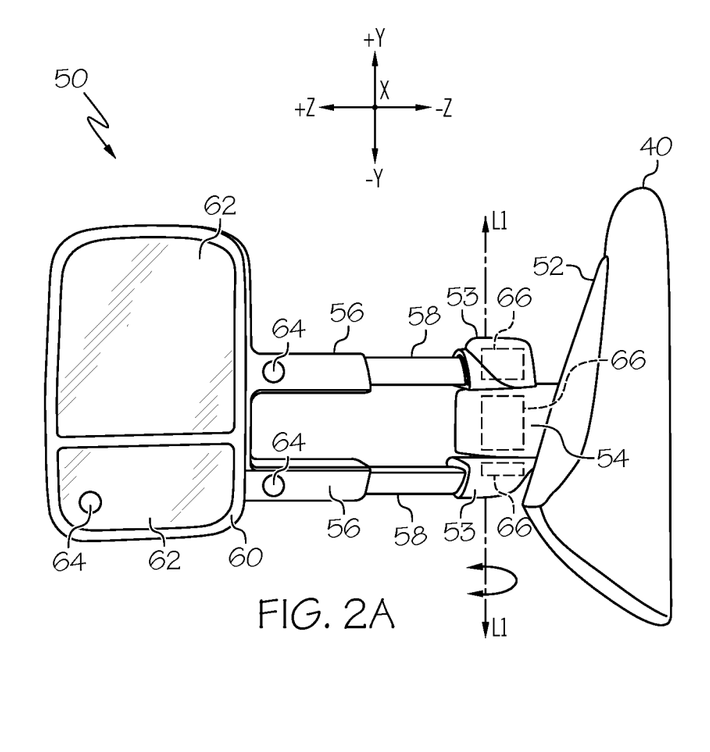
FIG. 2A schematically depicts a perspective front view of an illustrative towing mirror assembly of a vehicle according to one or more embodiments shown and described herein.
Figure 2B:
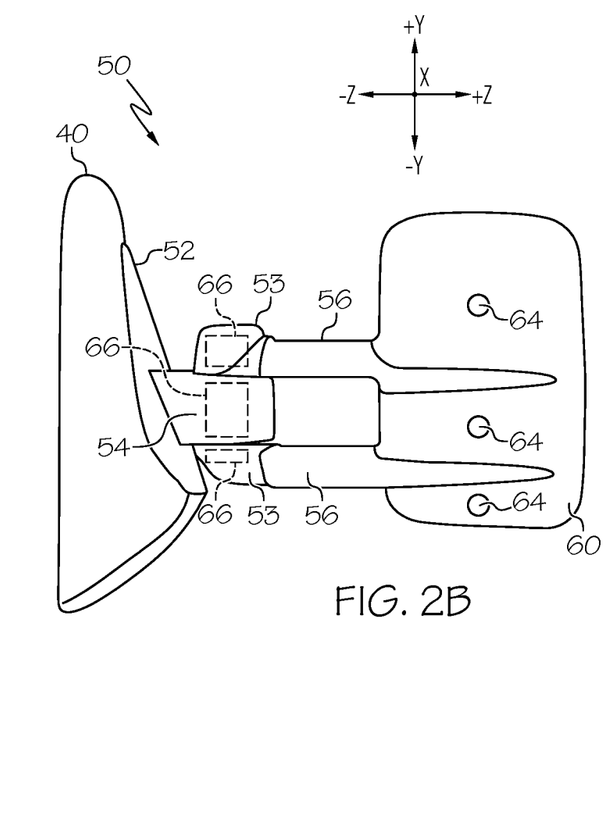
FIG. 2B schematically depicts a perspective back view of an illustrative towing mirror assembly of a vehicle according to one or more embodiments shown and described herein.

With reference to FIGS. 2A-2B, perspective views of an illustrative mirror assembly 50 are schematically depicted. In the illustrated embodiment of FIGS. 2A-2B, the mirror assembly 50 includes a mounting member 52, pivot members 53, attachment member 54, sleeve members 56, post members 58, a mirror body 60, mirrors 62, the one or more mirror sensors 64, and one or more actuators 66.

The mirror assembly 50 is coupled to the door 40 of the towing vehicle 10 via the mounting member 52. As a non-limiting example, the mounting member 52, which may be a mounting bracket or the like, may include one or more threaded studs that extend through the door 40 and are secured thereto using nuts. It should be understood that the mirror assembly 50 may be coupled to the door 40 utilizing various other coupling methods and is not limited to the embodiment described herein.

The attachment member 54 may be fixedly mounted to or integrally formed with the mounting member 52. The pivot members 53 may be pivotally coupled to the attachment member 54. As a non-limiting example, the pivot members 53 may be pivotally coupled to the attachment member 54 using various suitable fastening members, such as a pin or the like. As such, the mirror body 60 may be manually pivoted about line L1 extending through the pivot members 53. Furthermore, the mirror body 60 may automatically pivot about line L1 using the one or more actuators 66, as described below in further detail. In some embodiments, the mirror assembly 50 may include one or more cam locking devices (not shown) or the like for preventing the mirror body 60 from pivoting about line L1 beyond a predefined angular value.

In some embodiments, the post members 58 may be at least partially positioned within an opening of the pivot members 53 and an opening of the sleeve members 56. The mirror body 60 may be integrally coupled to the sleeve members 56.

The one or more actuators 66, which may be one or more electrical actuators (e.g., a direct current (DC) motor, such as a DC stepper motor, a DC servo motor, etc.), may be positioned at various locations of the mirror assembly 50, such as within the mirror body 60, the pivot members 53, and/or the attachment members 54. The one or more actuators 66 are configured to set the mirror assembly 50 to one of an extended position (as shown in FIG. 2A) and a retracted position (as shown in FIG. 2B). In some embodiments, the one or more actuators 66 cause the mirror body 60 and the sleeve members 56 integrally attached thereto to slide along the post members 58 away from the towing vehicle 10 when setting the mirror assembly 50 to the extended position. In some embodiments, the one or more actuators 66 cause the mirror body 60 and the sleeve members 56 integrally attached thereto to slide along the post members 58 toward the towing vehicle 10 when setting the mirror assembly 50 to the retracted position.

As described herein, the phrase "setting the mirror assembly 50 to the extended position" generally refers to moving the mirror body 60 in the positive vehicle lateral direction (i.e., +Z-direction). Setting the mirror assembly 50 to the extended position enables an operator of the towing vehicle 10 to have a view of the roadway behind or along the side of the object being towed, such as the trailing vehicle 20. The extended position of the mirror assembly 50 may comprise one or more locations in the vehicle lateral direction (i.e., Z-direction) and is not limited to any particular position.

As described herein, the phrase "setting the mirror assembly 50 to the retracted position" generally refers to moving the mirror body 60 in the negative vehicle lateral direction (i.e., −Z-direction). Setting the mirror assembly 50 to the retracted position may prevent an operator of the towing vehicle 10 from having a view of the roadway behind or along the side of the object being towed, such as the trailing vehicle 20. The retracted position of the mirror assembly 50 may comprise one or more locations in the vehicle lateral direction (i.e., Z-direction) and is not limited to any particular position. In some embodiments, the retracted position of the mirror assembly 50 may include an embodiment in which the mirror body 60 and the door 40 of the towing vehicle 10 are not separated by any distance.

In various embodiments, the one or more actuators 66 may be configured to adjust an orientation (e.g., an angle) of the mirror body 60 and/or the mirrors 62. As a non-limiting example, the one or more actuators 66 may cause the mirror body 60 to pivotally move about line L1 extending through the pivot members 53. As another non-limiting example, the one or more actuators 66 may cause the mirrors 62 to tilt in various directions (e.g., upwards or downwards in the +/−Y-direction).

The one or more mirror sensors 64 may be any sensor configured to generate proximity information corresponding to an environment surrounding the towing vehicle 10. As a non-limiting example, the one or more mirror sensors 64 may be at least one of a LIDAR sensor, a radar sensor, an infrared (IR) sensor, a sonar sensor, an ultrasonic sensor, an optical sensor, a Doppler Effect sensor, and/or the like. As described below in further detail, the one or more mirror sensors 64 may be selectively activated based on sensor data obtained by the one or more rear sensors 30. Additionally, the one or more mirror sensors 64 may generate sensor data to perform a position calibration of the mirror assembly 50 while the mirror body 60 is being set to the extended position, as described below in further detail. Furthermore, the one or more mirror sensors 64 may be calibrated while and/or when the mirror body 60 is set to the extended position, as described below in further detail.

The one or more mirror sensors 64 may be positioned at various locations of the mirror assembly 50. As a non-limiting example and as illustrated in FIG. 2A, the one or more mirror sensors 64 may be positioned on the sleeve members 56 and on a surface of the mirrors 62. As another non-limiting example and as illustrated in FIG. 2B, the one or more mirror sensors 64 may be positioned on a casing of the mirror body 60. It should be understood that the one or more mirror sensors 64 may be positioned at any location of the mirror assembly 50 and is not limited to the positions described herein. It should also be understood that any number of the one or mirror sensors 64 may be implemented and is not limited to the number of the one or more mirror sensors 64 shown in the illustrated embodiments.

Figure 2C:
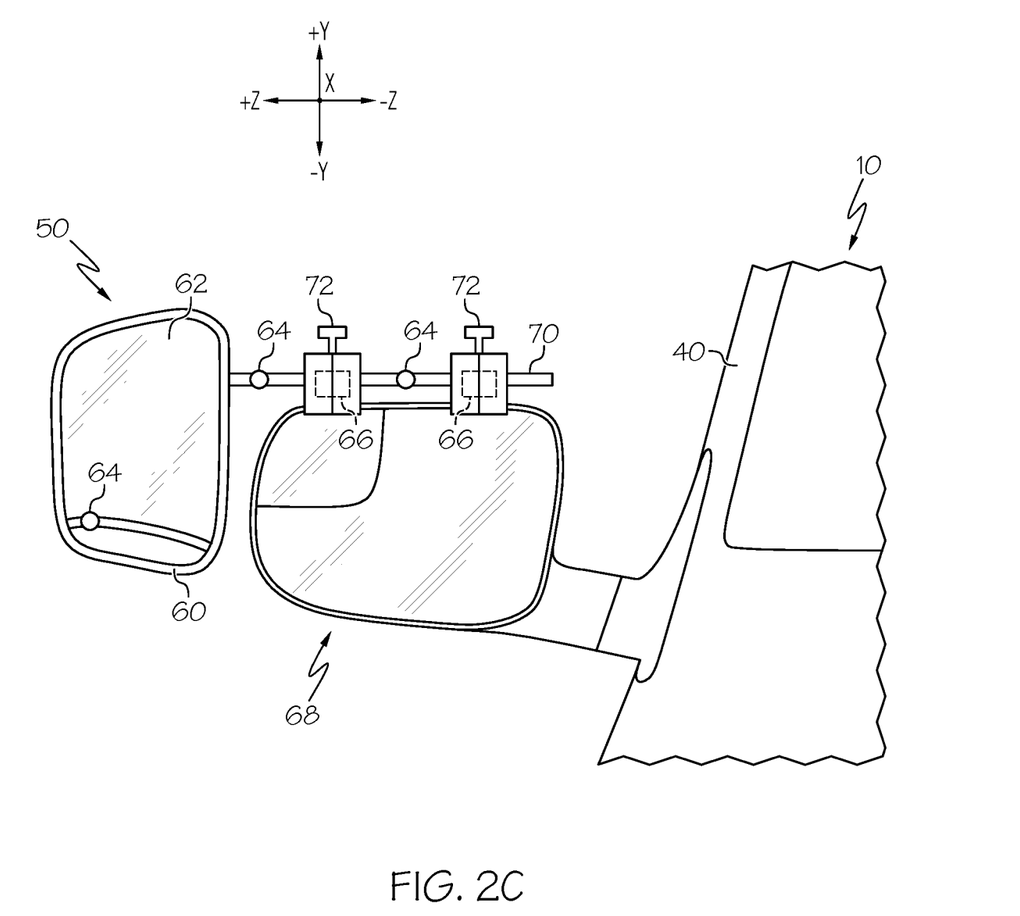
FIG. 2C schematically depicts a perspective view of an illustrative towing mirror assembly coupled to a side mirror of a vehicle according to one or more embodiments shown and described herein.

With reference to FIG. 2C, a perspective view of another illustrative mirror assembly 50 and a base mirror assembly 68 are schematically depicted. In the illustrated embodiment of FIG. 2C, the mirror assembly 50 may include the mirror body 60, the mirror 62, the one or more mirror sensors 64, the one or more actuators 66, post member 70, and attachment members 72.

In the illustrated embodiment of FIG. 2C, the base mirror assembly 68 is fixedly mounted to the door 40 of the towing vehicle 10. It should be understood that the base mirror assembly 68 may be coupled to various other components of the towing vehicle 10 in other embodiments. The mirror assembly 50 is attached to the base mirror assembly 68 via the attachment members 72 of the mirror assembly 50. As a non-limiting example, the attachment members 72 may be a clip or other similar mechanism configured to attach the mirror assembly 50 to the base mirror assembly 68 by receiving the post member 70. In response to receiving a signal from the controller (shown below), the one or more actuators 66 are configured to move the mirror body 60 by causing the post member 70 to slidably move within the attachment members 72.

It should be understood that the base mirror assembly 68 and the mirror assembly 50 may have other configurations in some embodiments. As a non-limiting example, the towing vehicle 10 may include a bracket (not shown) fixedly mounted thereto, and the mirror assembly 50 may be integrally formed with the bracket. Additionally, the base mirror assembly 68 may be positioned within a recess formed by the bracket in some embodiments.

Figure 3A:
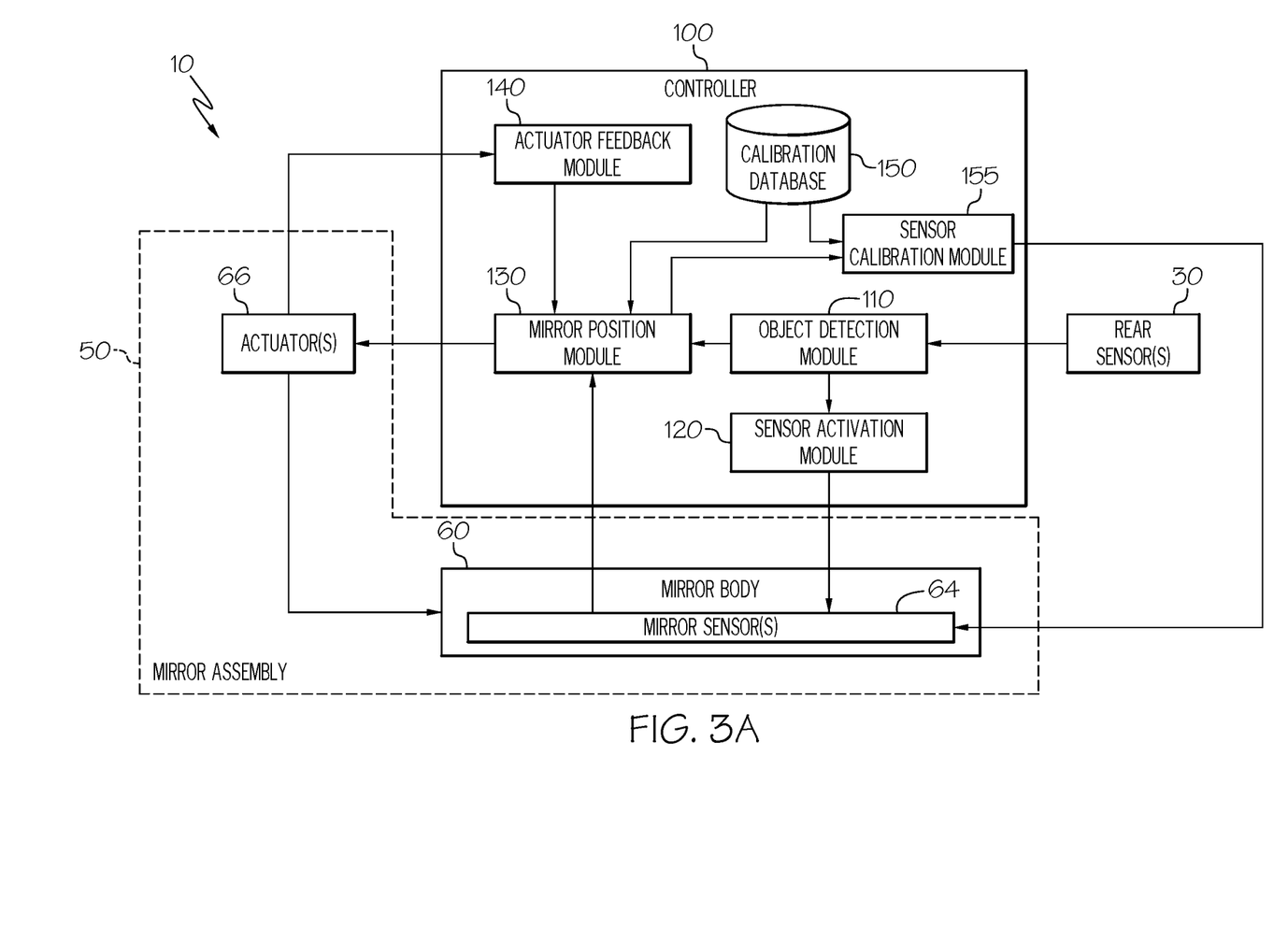
FIG. 3A schematically depicts a functional block diagram of illustrative modules and components contained within a vehicle according to one or more embodiments shown and described herein.

With reference to FIG. 3A, an example embodiment of the towing vehicle 10 is schematically depicted showing additional components contained therein. In some embodiments, the vehicle system 5 includes the one or more rear sensors 30, the mirror assembly 50, the one or more mirror sensors 64, the one or more actuators 66, and the controller 100. The controller 100 includes an object detection module 110, a sensor activation module 120, a mirror position module 130, an actuator feedback module 140, a calibration database 150, and a sensor calibration module 155. While the calibration database 150 is shown as a component of the controller 100, in some embodiments, the calibration database 150 may be located externally to the controller 100.

The one or more rear sensors 30 are communicatively coupled to the object detection module 110, and the one or more rear sensors 30 are configured to output one or more signals indicative of a presence of an object located near the rear 12 of the towing vehicle 10 to the object detection module 110. The one or more mirror sensors 64 are communicatively coupled to the sensor activation module 120, the mirror position module 130, and the sensor calibration module 155, and the one or more mirror sensors 64 are configured to output a signal indicative of a presence of an object located near the mirror assembly 50 of the towing vehicle 10. The one or more actuators 66 are communicatively coupled to the mirror position module 130 and the actuator feedback module 140, and the one or more actuators 66 are configured to adjust a position and/or orientation (e.g., an angle) of the mirror body 60. The various components of the vehicle system 5 may be communicatively coupled using a communication interface configured to transmit a signal, as described below in further detail with reference to FIG. 3B.

The controller 100 may be any system that effects control of one or more components of the towing vehicle 10, such as, for example, position and/or orientation control of the mirror assembly 50 and selective activation of the one or more mirror sensors 64. As a non-limiting example, the controller 100 may be implemented by an electronic control unit (ECU) of the towing vehicle 10. While the embodiment depicted in FIG. 3A specifically refers to the controller 100 controlling the mirror assembly 50 of the towing vehicle 10, it should be understood that other controllers may also be included within the towing vehicle 10 to control various other systems that do not specifically relate to the mirror assembly 50.

Figure 3B:
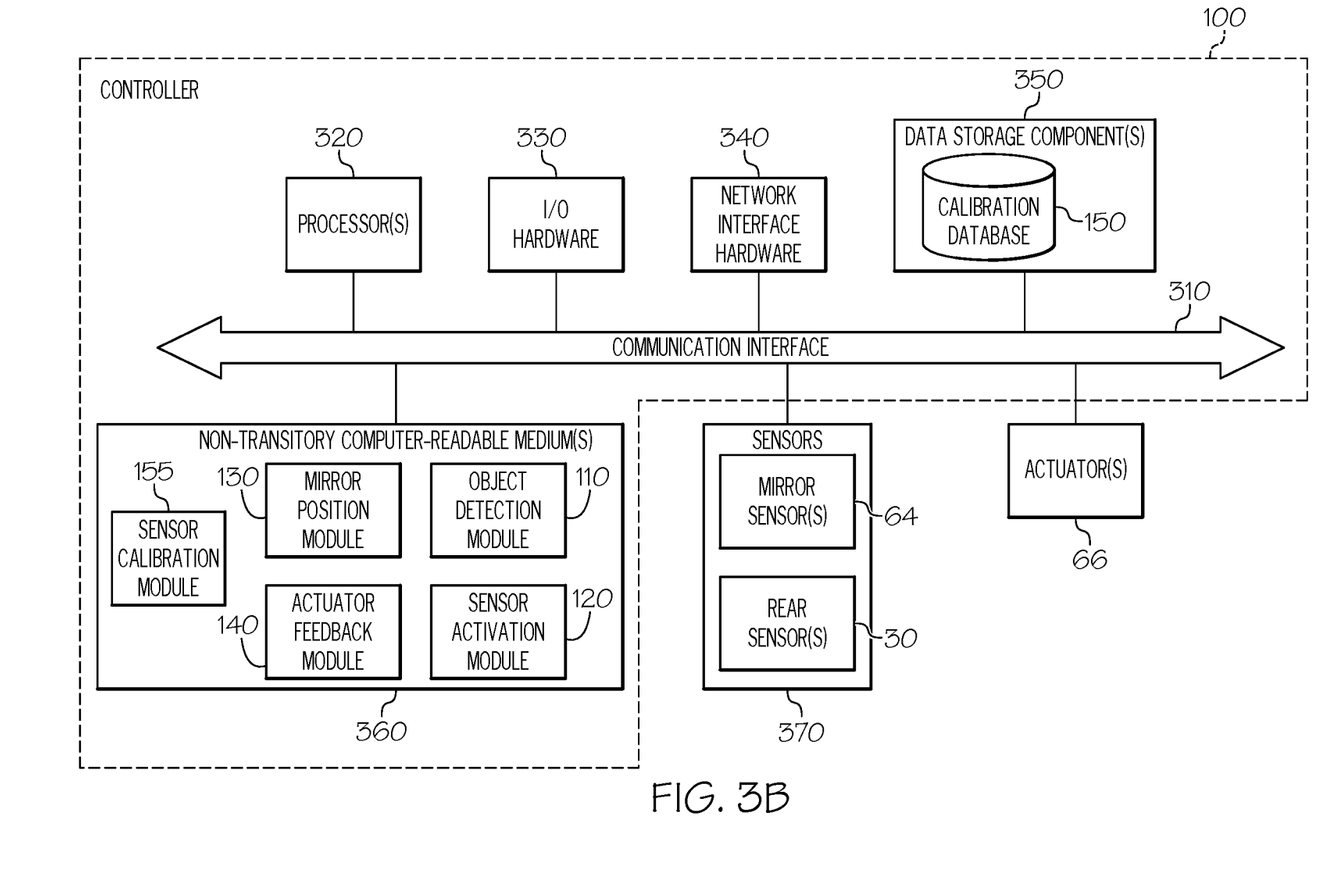
FIG. 3B schematically depicts a functional block diagram of illustrative modules and components contained within a controller of a vehicle according to one or more embodiments shown and described herein.

With reference to FIG. 3B, an example embodiment of the controller 100 schematically depicted showing additional hardware components contained therein. The controller 100 generally includes a communication interface 310, one or more processors 320, input/output hardware 330, network interface hardware 340, one or more data storage components 350, and one or more non-transitory computer-readable mediums 360. The components of the controller 100, sensors 370 (i.e., the one or more mirror sensors 64 and the one or more rear sensors 30), and the one or more actuators 66 may be physically and/or communicatively coupled through the communication interface 310.

The communication interface 310 is formed from any medium that is configured to transmit a signal. As non-limiting examples, the communication interface 310 is formed of conductive wires, conductive traces, optical waveguides, or the like. The communication interface 310 may also refer to the expanse in which electromagnetic radiation and their corresponding electromagnetic waves are propagated. Moreover, the communication interface 310 may be formed from a combination of mediums configured to transmit signals. In one embodiment, the communication interface 310 includes a combination of conductive traces, conductive wires, connectors, and buses that cooperate to permit the transmission of electrical data signals to and from the various components of the controller 100. Additionally, it is noted that the term "signal" means a waveform (e.g., electrical, optical, magnetic, mechanical or electromagnetic) configured to travel through a medium, such as DC, AC, sinusoidal-wave, triangular-wave, square-wave, vibration, and the like.

As described above, the one or more processors 320, each of which may be a computer processing unit (CPU), may receive and execute machine-readable instructions stored in the one or more non-transitory computer-readable mediums 360. As a non-limiting example, the one or more processors 320 may be one of a shared processor circuit, dedicated processor circuit, or group processor circuit. As described herein, the term "shared processor circuit" refers to a single processor circuit that executes some or all machine-readable instructions from the multiple modules. As described herein, the term "group processor circuit" refers to a processor circuit that, in combination with additional processor circuits, executes some or all machine-executable instructions from the multiple modules of the one or more non-transitory computer-readable mediums 360. References to multiple processor circuits encompass multiple processor circuits on discrete dies, multiple processor circuits on a single die, multiple cores of a single processor circuit, multiple threads of a single processor circuit, or a combination of the above.

The input/output hardware 330 may include a basic input/output system (BIOS) that interacts with hardware of the controller 100, device drivers that interact with particular devices of the controller 100, one or more operating systems, user applications, background services, background applications, etc. The network interface hardware 340 may include and/or be configured to communicate with any wired or wireless networking hardware, including an antenna, a modem, a LAN port, a wireless fidelity (Wi-Fi) card, a WiMax card, a long term evolution (LTE) card, a ZigBee card, a Bluetooth chip, a USB card, mobile communications hardware, and/or other hardware for communicating with other networks and/or devices. The one or more data storage components 350, which include the calibration database 150, are communicatively coupled to the one or more processors 320. As a non-limiting example, the one or more data storage components 350 may include one or more database servers that support NoSQL, MySQL, Oracle, SQL Server, NewSQL, or the like.

The one or more non-transitory computer-readable mediums 360 are communicatively coupled to the one or more processors 320. As a non-limiting example, the one or more non-transitory computer-readable mediums 360 may be one of a shared memory circuit, dedicated memory circuit, or group memory circuit. As described herein, the term "shared memory circuit" refers to a single memory circuit that stores some or all machine-readable instructions from multiple modules, which are described below in further detail. As described herein, the term "group memory circuit" refers to a memory circuit that, in combination with additional memories, stores some or all machine-readable instructions from the multiple modules. Non-limiting examples of the one or more non-transitory computer-readable mediums 360 include random access memory (including SRAM, DRAM, and/or other types of random access memory), read-only memory (ROM), flash memory, registers, compact discs (CD), digital versatile discs (DVD), and/or other types of storage components.

A description of the various modules of the controller 100 will now be provided with reference to FIGS. 3A-3B. As described herein, the term module may refer to, be part of, or include: an Application Specific Integrated Circuit (ASIC); a digital, analog, or mixed analog/digital discrete or integrated circuit; a combinational logic circuit; a field programmable gate array (FPGA); a processor circuit that executes machine-readable instructions; a memory circuit that stores machine-readable instructions executed by the processor circuit; other suitable hardware components that provide the described functionality; or a combination of some or all of the above.

The object detection module 110 receives input from the one or more rear sensors 30, determines whether an object (e.g., the trailing vehicle 20) is located near the rear 12 of the towing vehicle 10, and provides the determination to the sensor activation module 120 and the mirror position module 130. Further details regarding the operation of the object detection module 110 are provided below in FIGS. 4-5, for example.

The sensor activation module 120 receives input from the object detection module 110 and selectively activates the one or more mirror sensors 64 based on the received input. Further details regarding the operation of the sensor activation module 120 are provided below in FIGS. 4-5, for example.

The mirror position module 130 receives inputs from the object detection module 110 and the actuator feedback module 140 and controls the one or more actuators 66 to adjust the position and/or orientation of the mirror assembly 50 based on the received inputs. Further details regarding the operation of the mirror position module 130 are provided below in FIGS. 4-7, for example.

The actuator feedback module 140 receives inputs from the one or more actuators 66 and provides position and/or orientation feedback to the mirror position module 130 based on the received inputs. Further details regarding the operation of the actuator feedback module 140 are provided below in FIGS. 6-7, for example.

The sensor calibration module 155 receives inputs from the mirror position module 130 and calibrates the one or more mirror sensors 64 based on the received inputs. Further details regarding the operation of the sensor calibration module 155 are provided below in FIG. 5, for example.

Figure 4:
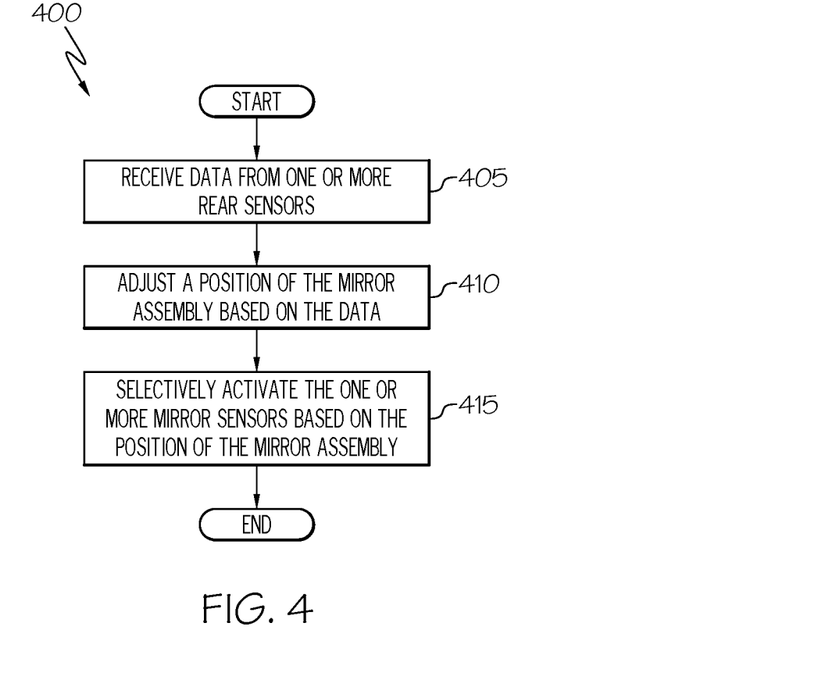
FIG. 4 depicts a flow diagram of an illustrative method of automatically operating a towing mirror assembly of a vehicle according to one or more embodiments shown and described herein.

With reference to FIG. 4, a flow diagram of an illustrative method 400 of operating the mirror assembly 50 of the towing vehicle 10 is depicted. While the blocks shown in FIG. 4 are shown as all-occurring and in a particular order, in other embodiments, one or more of the blocks may not be performed, and in some embodiments, one or more of the blocks may be performed in a different order as shown and described herein.

Referring to FIGS. 1, 3A-3B, and 4, the object detection module 110 of the controller 100 receives data from the one or more rear sensors 30 at block 405. In some embodiments, the data received by the one or more rear sensors 30 may correspond to the proximity, presence, and/or characteristics of an object located behind the rear 12 of the towing vehicle 10, such as the trailing vehicle 20. As a non-limiting example, the one or more rear sensors 30, which may be a plurality of LIDAR sensors, may generate data indicating whether an object is located behind the rear 12 of the towing vehicle 10. As another non-limiting example, the one or more rear sensors 30 may generate data indicating a distance between an object (e.g., the trailing vehicle 20) and the rear 12 of the towing vehicle 10. As yet another non-limiting example, the one or more rear sensors 30 may generate data indicating various geometric or identifying characteristics of the object, such as a width and length of the object located behind the rear 12 of the towing vehicle 10.

Still referring to FIGS. 1, 3A-3B, and 4, at block 410, the mirror position module 130 of the controller 100 adjusts the position of the mirror assembly 50 based on the data. In some embodiments, the mirror position module 130 adjusts the position of the mirror assembly 50 from the retracted position to the extended position based on the data obtained by the one or more rear sensors 30. In some embodiments, the mirror position module 130 of the controller 100 adjusts the position of the mirror assembly 50 from the extended position to the retracted position based on the data obtained by the one or more rear sensors 30.

As a non-limiting example, if the mirror assembly 50 is in the retracted position and if the object detection module 110 determines that the data obtained by the one or more rear sensors 30 indicates the trailing vehicle 20 (or other object) is located behind the rear 12 of the towing vehicle 10, the mirror position module 130 may generate a signal causing the one or more actuators 66 to move the mirror assembly 50 from the retracted position to the extended position. As another non-limiting example, if the mirror assembly 50 is in the extended position and if the object detection module 110 determines that the data obtained by the one or more rear sensors 30 indicates that the trailing vehicle 20 (or other object) is not located behind the rear 12 of the towing vehicle 10 (i.e., the towing vehicle 10 is not towing an object), the mirror position module 130 may generate a signal causing the one or more actuators 66 to move the mirror assembly 50 from the extended position to the retracted position.

Furthermore, while moving the mirror assembly 50 from the retracted position to the extended position, the mirror position module 130 and/or the actuator feedback module 140 may execute a position calibration process to selectively determine a particular distance in which the mirror body 60 and the door 40 of the towing vehicle 10 are separated. Example position calibration processes are described below in further detail with reference to FIGS. 6-7.

Referring to FIGS. 1, 2A-2C, 3A-3B, and 4, at block 415, the sensor activation module 120 of the controller 100 selectively activates the one or more mirror sensors 64 based on the position of the mirror assembly 50. In some embodiments, the sensor activation module 120 activates (i.e., turns on) the one or more mirror sensors 64 of the mirror assembly 50 when the mirror position module 130 sets the mirror assembly 50 to the extended position. In various embodiments, the sensor activation module 120 activates the one or more mirror sensors 64 of the mirror assembly 50 while the mirror position module 130 is setting the mirror assembly 50 to the extended position.

In some embodiments, the sensor activation module 120 deactivates (i.e., turns off) the one or more mirror sensors 64 of the mirror assembly 50 when the mirror position module 130 sets the mirror assembly 50 to the retracted position. In various embodiments, the sensor activation module 120 deactivates the one or more mirror sensors 64 of the mirror assembly 50 while the mirror position module 130 is setting the mirror assembly 50 to the retracted position.

Figure 5:
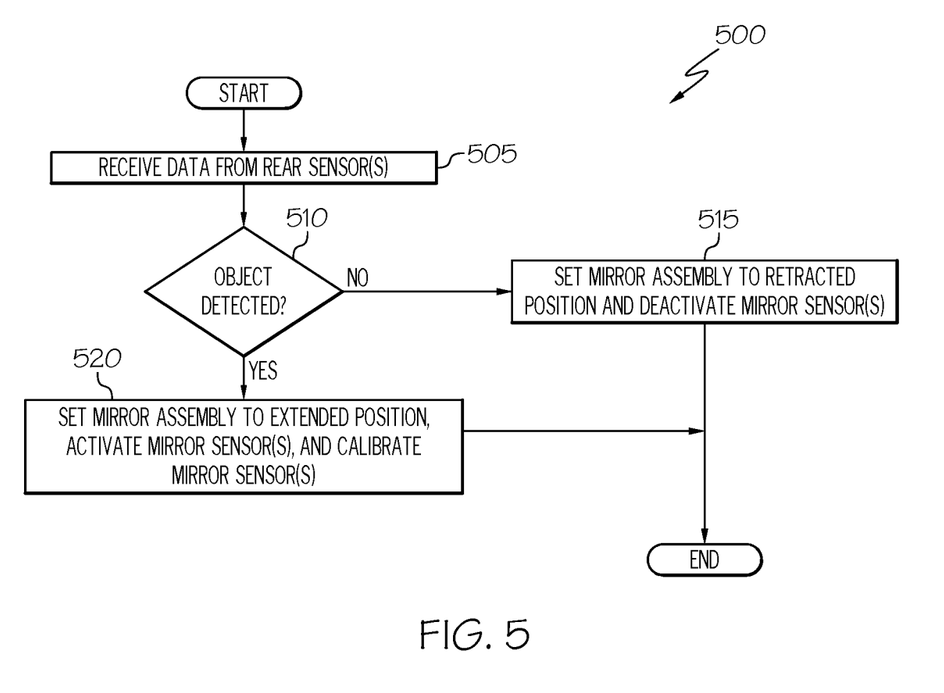
FIG. 5 depicts a flow diagram of an illustrative method of automatically setting a position of a towing mirror assembly according to one or more embodiments shown and described herein.

With reference to FIG. 5, a flow diagram of an illustrative method 500 of setting a position of the mirror assembly 50 is depicted. While the blocks shown in FIG. 5 are shown as all-occurring and in a particular order, in other embodiments, one or more of the blocks may not be performed, and in some embodiments, one or more of the blocks may be performed in a different order as shown and described herein.

Referring to FIGS. 1, 3A-3B, and 5, at block 505, the object detection module 110 of the controller 100 receives data from the one or more rear sensors 30. At block 510, the object detection module 110 of the controller 100 determines whether the data indicates an object (e.g., the trailing vehicle 20) is located behind the rear 12 of the towing vehicle 10. As a non-limiting example, the object detection module 110 may determine the data indicates an object is located behind the rear 12 of the towing vehicle 10 if data indicates that an object is located within a threshold distance of the towing vehicle 10 (e.g., 5 feet). If so, the method 500 proceeds to block 520; otherwise, the method 500 proceeds to block 515.

Still referring to FIGS. 1, 3A-3B, and 5, at block 515, the mirror position module 130 of the controller 100 sets the position of the mirror assembly 50 to the retracted position, and the sensor activation module 120 of the controller 100 deactivates the one or more mirror sensors 64. At block 520, the mirror position module 130 of the controller 100 sets the position of the mirror assembly 50 to the extended position, and the sensor activation module 120 of the controller 100 activates the one or more mirror sensors 64.

Furthermore, at block 520, the sensor calibration module 155 calibrates the one or more mirror sensors 64 when or while the position of the mirror assembly 50 is set to the extended position. As a non-limiting example, the sensor calibration module 155 may receive position data of the mirror assembly 50 from the mirror position module 130. Based on the position data, the sensor calibration module 155 may calibrate the one or more mirror sensors 64 by identifying one or more entries in the calibration database 150 that correlates the position data to sensor offset values. Subsequently, the controller 100 may adjust the proximity data obtained by the one or more mirror sensors 64 based on the sensor offset values when executing various functions, such as a blind spot monitoring algorithm. As such, the accuracy of the functions utilizing the proximity data of the one or more mirror sensors 64 and executed by the controller 100 is improved when the one or more mirror sensors 64 are calibrated.

As another non-limiting example, the sensor calibration module 155 may receive position data of the mirror assembly 50 from the mirror position module 130. Based on the position data, the sensor calibration module 155 may calibrate the one or more mirror sensors 64 by identifying one or more entries in the calibration database 150 that correlates the position data to sensor position adjustment values. Subsequently, the controller 100 may adjust the positions (e.g., angles) of the one or more mirror sensors 64 using the one or more actuators 66 based on the sensor position adjustment values to improve the accuracy of various algorithms executed by the controller 100, such as a blind spot monitoring algorithm.

While the mirror position module 130 of the controller 100 sets the position of the mirror assembly 50 to the extended position, the mirror position module 130 may execute a position calibration process to selectively determine a particular distance in which the mirror body 60 and the door 40 of the towing vehicle 10 are separated while the mirror assembly 50 is being set to the extended position. Various illustrative position calibration processes executed by the mirror position module 130 and/or the actuator feedback module 140 will now be provided below with reference to FIGS. 6-7. It should be understood that the position calibration processes are not limited to the embodiments described herein, and the position calibration processes may include various other processes that selectively determine a particular distance in which the mirror body 60 and the door 40 of the towing vehicle 10 are separated while the mirror assembly 50 is being set to the extended position.

Figure 6:
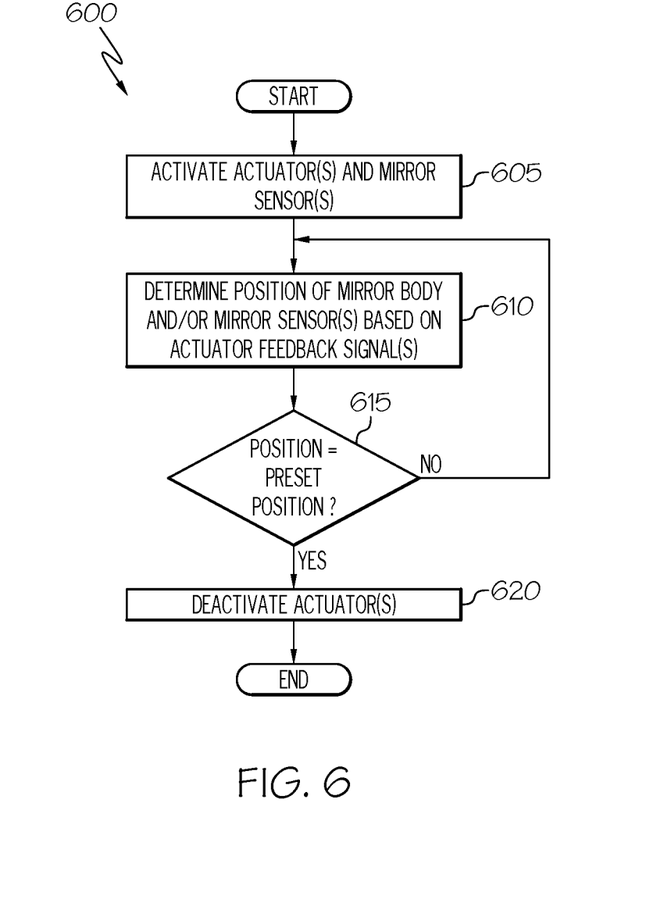
FIG. 6 depicts a flow diagram of an illustrative method of automatically calibrating the towing mirror assembly according to one or more embodiments shown and described herein.

With reference to FIG. 6, a flow diagram of an illustrative method 600 of executing the position calibration process of the mirror assembly 50 is depicted. While the blocks shown in FIG. 6 are shown as all-occurring and in a particular order, in other embodiments, one or more of the blocks may not be performed, and in some embodiments, one or more of the blocks may be performed in a different order as shown and described herein.

Referring to FIGS. 1, 3A-3B, and 6, at block 605, the controller 100 activates the one or more actuators 66, and the sensor activation module 120 of the controller 100 activates the one or more mirror sensors 64. In some embodiments, the controller 100 activates the one or more actuators 66 by turning on the one or more actuators 66 and causing the one or more actuators 66 to extend the mirror body 60 away from the towing vehicle 10. Furthermore, the controller 100 may activate the one or more actuators 66 in response to determining (using the object detection module 110) the presence of an object located behind the rear 12 of the towing vehicle 10. As described above, the sensor activation module 120 of the controller 100 activates the one or more mirror sensors 64 in response to determining (using the object detection module 110) the presence of an object located behind the rear 12 of the towing vehicle 10.

Still referring to FIGS. 1, 3A-3B, and 6, at block 610, the actuator feedback module 140 of the controller 100 determines the position of the mirror body 60 and/or the one or more mirror sensors 64 based on position signals received from the one or more actuators 66. As a non-limiting example, the one or more actuators 66 may include a DC motor (e.g., a DC blockper motor, a DC servo motor, etc.), and the actuator feedback module 140 may be a proportional-integral-derivative (PID) controller configured to obtain position and/or orientation data from the one or more actuators 66. Accordingly, the actuator feedback module 140 may determine a distance between the door 40 of the towing vehicle 10 and the mirror body 60 based on the position and/or orientation data obtained from the one or more actuators 66. It should be understood that the one or more actuators 66 may include various types of actuators and is not limited to the embodiments described herein. It should also be understood that the actuator feedback module 140 may be implemented by various other types of control logic in other embodiments and is not limited to the embodiments described herein.

Referring to FIGS. 1, 3A-3B, and 6, at block 615, the actuator feedback module 140 determines whether the position and/or orientation data indicates that the position of the mirror body 60 is equal to a preset position stored in the calibration database 150. In some embodiments, the preset position may correspond to a distance between the door 40 of the towing vehicle 10 and the mirror body 60 that provides for a view of the roadway behind or along the side of the object being towed (e.g., the trailing vehicle 20). As a non-limiting example, the preset position may be a distance of 5 centimeters between the mirror body 60 and the door 40 of the towing vehicle 10. As another non-limiting example, the preset position may be a distance of 50 centimeters between the mirror body 60 and the door 40 of the towing vehicle 10. It should be understood that the preset position may be any distance that provides for a view of the roadway behind or along the side of the object being towed to a driver of the towing vehicle 10. If the position of the mirror body 60 is equal to the preset position, the method 600 proceeds to block 620 and deactivates the one or more actuators 66. Otherwise, the method 600 proceeds to block 610.

Figure 7:
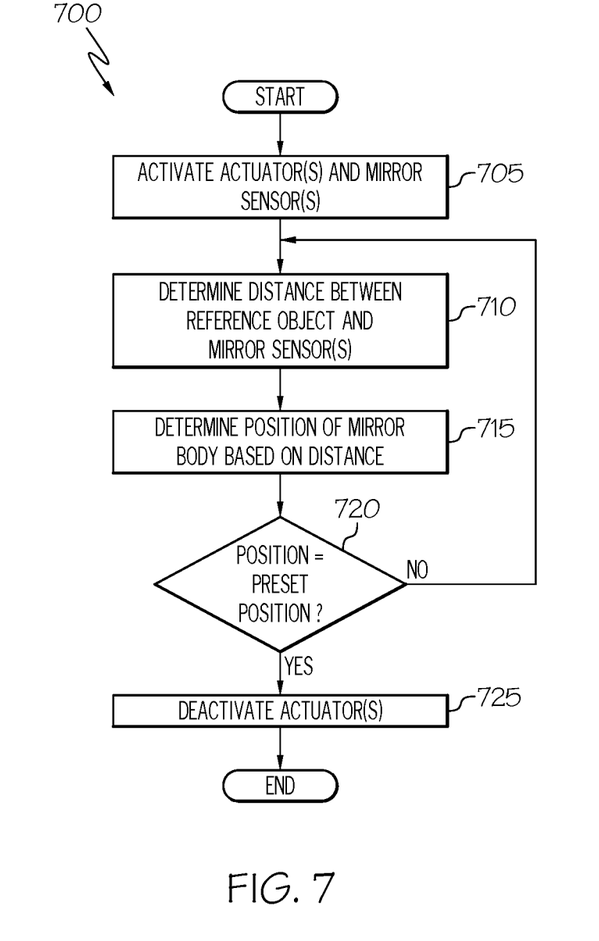
FIG. 7 depicts a flow diagram of an illustrative method of automatically calibrating the towing mirror assembly according to one or more embodiments shown and described herein.

With reference to FIG. 7, a flow diagram of another illustrative method 700 of performing the position calibration process of the mirror assembly 50 is depicted. While the blocks shown in FIG. 7 are shown as all-occurring and in a particular order, in other embodiments, one or more of the blocks may not be performed, and in some embodiments, one or more of the blocks may be performed in a different order as shown and described herein.

Referring to FIGS. 1, 3A-3B, and 7, at block 705, the controller 100 activates the one or more actuators 66, and the sensor activation module 120 of the controller 100 activates the one or more mirror sensors 64. In some embodiments, the controller 100 activates the one or more actuators 66 by turning on the one or more actuators 66 and causing the one or more actuators 66 to extend the mirror body 60 away from the towing vehicle 10. Furthermore, the controller 100 may activate the one or more actuators 66 in response to determining (using the object detection module 110) the presence of an object located behind the rear 12 of the towing vehicle 10. As described above, the sensor activation module 120 of the controller 100 activates the one or more mirror sensors 64 in response to determining (using the object detection module 110) the presence of an object located behind the rear 12 of the towing vehicle 10.

Referring to FIGS. 1, 3A-3B, and 7, at block 710, the mirror position module 130 of the controller 100 determines the distance between a reference object and the one or more mirror sensors 64. As used herein, the phrase "reference object" refers to an object of or near the towing vehicle 10. As a non-limiting example, the reference object may be a particular component of the towing vehicle 10, such as an antenna, a hood, a window, a tire, or any other component of the towing vehicle 10. As another non-limiting example, the reference object may be associated with a particular two-dimensional (2D) or three-dimensional (3D) coordinate of or near the towing vehicle 10.

Still referring to FIGS. 1, 3A-3B, and 7, at block 715, the mirror position module 130 of the controller determines a position of the mirror body 60 based on the distance between the reference object and the one or more mirror sensors 64. As a non-limiting example, the mirror position module 130 may determine the position of the mirror body 60 by referencing one or more entries in the calibration database 150. In some embodiments, each entry of the one or more entries includes information associating a distance between the reference object and the one or more mirror sensors 64 to a position of the mirror body 60.

Still referring to FIGS. 1, 3A-3B, and 7, at block 720, the mirror position module 130 determines whether the position data indicates that the position of the mirror body 60 is equal to a preset position stored in the calibration database 150. In some embodiments, the preset position may correspond to a distance between the door 40 of the towing vehicle 10 and the mirror body 60 that provides for a view of the roadway behind or along the side of the object being towed (e.g., the trailing vehicle 20). As a non-limiting example, the preset position may be a distance of 5 centimeters between the mirror body 60 and the door 40 of the towing vehicle 10. As another non-limiting example, the preset position may be a distance of 50 centimeters between the mirror body 60 and the door 40 of the towing vehicle 10. It should be understood that the preset position may be any distance that provides for a view of the roadway behind or along the side of the object being towed to a driver of the towing vehicle 10. If the position of the mirror body 60 is equal to the preset position, the method 700 proceeds to block 725 and deactivates the one or more actuators 66. Otherwise, the method 700 proceeds to block 710.

It should now be understood that the embodiments described herein relate to devices, systems, and methods for calibrating one or more sensors of the towing mirror assemblies based on the distance in which the towing mirror assembly extends from the vehicle. By calibrating the one or more sensors of the towing mirror assembly based on the distance in which the towing mirror assembly extends from the vehicle, the accuracy of various functions executed by the controller, such as a blind spot monitoring algorithm, lane keeping assist function, and/or the like, are improved.

Furthermore, it should now be understood that the embodiments described herein relate to selectively positioning a mirror assembly during a position calibration process and selectively activating one or more components, such as a mirror sensor, of the mirror assembly based on data obtained by a corresponding vehicle system. By selectively positioning the mirror assembly during a position calibration process, the mirror assembly provides a view of the roadway behind or along the side of an object being towed to a driver of the vehicle. Moreover, by selectively positioning the mirror assembly during a position calibration process, the operation of the one or more sensors of the mirror assembly is improved as the trailer vehicle or object being towed by the vehicle is unable to interfere with the sensor operation.

The functional blocks and/or flowchart elements described herein may be translated into machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It will be apparent to those skilled in the art that various modifications and variations can be made without departing from the scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A vehicle, comprising:
a plurality of sensors comprising a first set and a second set;
a mirror assembly comprising a mirror body and one or more actuators actuable to move the mirror assembly between an extended position and a retracted position, wherein the second set is positioned on the mirror assembly; and
a controller communicatively coupled to the sensors and the actuators, wherein the controller:
causes the actuators to adjust a position of the mirror body based on information received from the first set;
selectively activates the second set based on the position; and
calibrates the second set while the position is set to the extended position.

2. The vehicle of claim 1, wherein the controller causes the one or more actuators to adjust the position of the mirror body in response to the information received from the first set of the plurality of sensors indicating that an object is coupled to a trailer hitch of the vehicle.

3. The vehicle of claim 2, wherein the first set of the plurality of sensors is positioned on a rear of the vehicle.

4. The vehicle of claim 1, wherein the controller activates the second set of the plurality of sensors when the mirror body is set to the extended position.

5. The vehicle of claim 1, wherein information received from the second set of the plurality of sensors indicates at least one of a distance and an angle between the second set of the plurality of sensors and a reference object of the vehicle.

6. The vehicle of claim 5, wherein calibrating the second set of the plurality of sensors while the position of the mirror body is set to the extended position causes the controller to:
identify an entry in a database, wherein the entry indicates a distance and a position of the mirror body associated with the distance;
determine whether the position of the mirror body is equal to a preset position; and
adjust the position of the mirror body in response to the position of the mirror body not being equal to the preset position.

7. The vehicle of claim 1, wherein calibrating the second set of the plurality of sensors while the position of the mirror body is set to the extended position causes the controller to:
determine a distance between the mirror body and the vehicle based on a position signal received from the one or more actuators; and
calibrate the second set based on the distance.

8. The vehicle of claim 1, wherein the plurality of sensors comprises at least one of a LIDAR sensor, a radar sensor, an infrared sensor, a sonar sensor, an ultrasonic sensor, an optical sensor, and a Doppler effect sensor.

9. A method of operating a mirror assembly of a vehicle comprising a plurality of sensors, the plurality of sensors comprising a first set and a second set, the second set positioned on the mirror assembly, the mirror assembly comprising a mirror body and one or more actuators actuable to move the mirror assembly between an extended position and a retracted position, the method comprising:
adjusting, using a controller, a position of the mirror body based on information received from the first set of the plurality of sensors;
selectively activating, using the controller, the second set of the plurality of sensors based on the position of the mirror body; and
calibrating, using the controller, the second set of the plurality of sensors while the position of the mirror body is set to the extended position.

10. The method of claim 9, further comprising adjusting the position of the mirror body in response to the information received from the first set of the plurality of sensors indicating that an object is coupled to a trailer hitch of the vehicle.

11. The method of claim 9, further comprising activating the second set of the plurality of sensors when the mirror body is set to the extended position.

12. The method of claim 9, wherein information received from the second set of the plurality of sensors indicates at least one of a distance and an angle between the second set of the plurality of sensors and a reference object of the vehicle.

13. The method of claim 12, wherein calibrating the second set of the plurality of sensors while the position of the mirror body is set to the extended position further comprises:
identifying, using the controller, an entry in a database, wherein the entry indicates a distance and a position of the mirror body associated with the distance;
determining, using the controller, whether the position of the mirror body is equal to a preset position; and
adjusting, using the controller, the position of the mirror body in response to the position of the mirror body not being equal to the preset position.

14. The method of claim 9, wherein calibrating the second set of the plurality of sensors while the position of the mirror body is set to the extended position further comprises:
determining, using the controller, a distance between the mirror body and the vehicle based on a position signal received from the one or more actuators; and
calibrating, using the controller, the second set based on the distance.

15. A vehicle comprising:
a mirror assembly comprising a mirror body and an actuator actuable to move the mirror body between an extended position and a retracted position;
a plurality of sensors comprising a first set disposed at a rear of the vehicle and a second set disposed on the mirror body; and
a controller communicatively coupled to the plurality of sensors and the actuator, wherein the controller is programmed to:
cause the actuator to extend the mirror body based on information received from the first set;
and
calibrate the second set to account for the extended position of the mirror body.

16. The vehicle of claim 15, wherein the controller causes the one or more actuators to adjust the position of the mirror body in response to the information received from the first set of the plurality of sensors indicating that an object is coupled to a trailer hitch of the vehicle.

17. The vehicle of claim 15, wherein the first set comprises at least one of a LIDAR sensor, a radar sensor, an infrared sensor, a sonar sensor, an ultrasonic sensor, an optical sensor, and a Doppler effect sensor.

18. The vehicle of claim 15, wherein the controller is programmed to calibrate the second set of the plurality of sensors when the mirror body is set to the extended position by:

determining a distance between the mirror body and the vehicle based on a position signal received from the one or more actuators; and calibrating the second set based on the distance.

* * * * *

UNITED STATES PATENT AND TRADEMARK OFFICE
CERTIFICATE OF CORRECTION

| | | |
|---|---|---|
| PATENT NO. | : 11,305,694 B2 | |
| APPLICATION NO. | : 16/674403 | |
| DATED | : April 19, 2022 | |
| INVENTOR(S) | : Ethan W. Pomish and Todd Muck | |

It is certified that error appears in the above-identified patent and that said Letters Patent is hereby corrected as shown below:

On the Title Page

Column 2, item (56), U.S. patent documents, cite no. 5, delete "Dupuis" and insert --Dupuis et al.--, therefor.

Column 2, item (56), U.S. patent documents, cite no. 10, delete "Dupuis" and insert --Dupuis et al.--, therefor.

Signed and Sealed this
Fourteenth Day of June, 2022

Katherine Kelly Vidal
*Director of the United States Patent and Trademark Office*